United States Patent

[11] 3,602,770

[72] Inventor William McMahon
 Summit, N.J.
[21] Appl. No. 18,786
[22] Filed Mar. 3, 1970
[45] Patented Aug. 31, 1971
[73] Assignee Bell Telephone Laboratories, Incorporated
 Murray Hill, N.J.
 Continuation of application Ser. No.
 502,165, Oct. 22, 1965, now abandoned.

[54] DISTRIBUTED R-C NETWORKS USING METALLIZED PLASTIC FILM
 3 Claims, 10 Drawing Figs.

[52] U.S. Cl. .................................................. 317/11,
 333/70 RC, 333/79, 317/157, 317/260, 317/DIG.
 6, 307/104
[51] Int. Cl. ............................................................. H01h 9/42
[50] Field of Search ............................................ 333/70 R,
 79; 317/256, 242, 12

[56] References Cited
 UNITED STATES PATENTS
| | | | |
|---|---|---|---|
| 3,302,081 | 9/1965 | Grahame | 317/256 |
| 3,148,315 | 9/1964 | Roudeau | 317/258 |
| 2,634,315 | 4/1953 | Allison | 333/70 R |
| 3,093,775 | 6/1963 | Lamphier | 317/260 |
| 2,957,114 | 10/1960 | Lamphier | 317/260 |
| 3,371,295 | 2/1968 | Bourgalt | 333/70 R |
| 2,816,273 | 12/1957 | Peck | 333/23 |
| 2,721,311 | 10/1955 | Netherwood | 333/23 |
| 3,173,111 | 3/1965 | Kallman | 333/31 |
| 2,884,605 | 4/1959 | Dubilier | 333/79 |
| 3,289,276 | 12/1966 | Wasyluk | 29/155.5 |
| 3,109,983 | 11/1963 | Cooper | 323/74 |
| 3,163,833 | 12/1964 | Burson | 333/79 |

FOREIGN PATENTS

| 743,717 | 1/1956 | Great Britain | 333/70 R |
|---|---|---|---|

Primary Examiner—Herman Karl Saalbach
Assistant Examiner—C. Baraff
Attorneys—R. J. Guenther and Edwin B. Cave ABSTRACT: This disclosure describes several distributed R-C components structures characterized principally by a floating electrode to which an electrical connection is directly made. These structures typically comprise alternate layers of plastic and metal or metallized plastic strips. The structures are shown to be advantageous in telephone relay contact protection application.

PATENTED AUG 31 1971 3,602,770
SHEET 1 OF 5
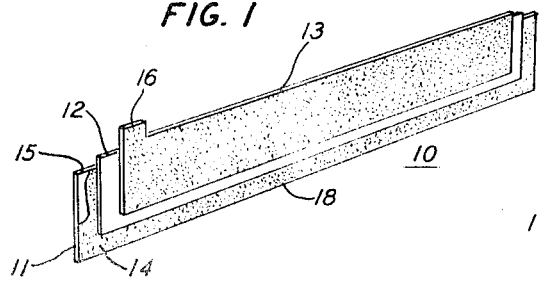
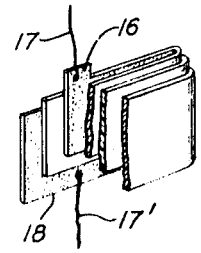
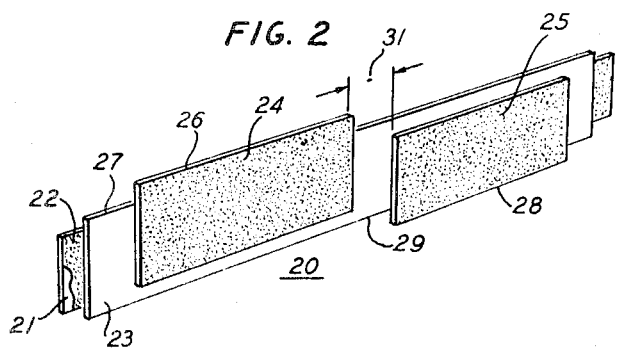
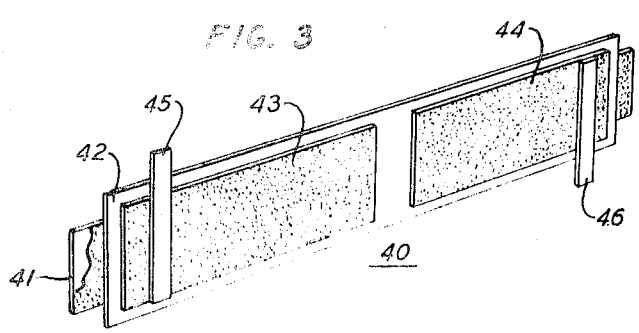
INVENTOR
W. McMAHON
BY
ATTORNEY

DISTRIBUTED R-C NETWORKS USING METALLIZED PLASTIC FILM

This is a continuation of copending application of William McMahon, Ser. No. 502,165, filed Oct. 22, 1965 now abandoned.

This invention relates to electrical circuit components and more particularly to components having a substantial built-in distributed resistance-capacitance characteristic.

Resistance-capacitance distribution is a well-known general phenomenon inherent in many types of electric equipment as, for example, coaxial cable, waveguide and ordinary wire pair. Recently the emergence of microminiature components and in particular the use of thin films to fabricate capacitors and resistors have given rise to increased theoretical interest in the phenomenon and its possible circuit applications. An analytical discussion of a basic three-layer resistance-capacitance distributed-parameter structure, for example, is presented in "Distributed Parameter Circuits and Microsystem Electronics" by P. S. Castro and W. W. Happ, *Proc. National Electronics Conf.* 1960, Vol. 16, page 448.

The attractive possibilities of building both resistance and capacitance into a single component the size of a tubular capacitor have been recognized for some time. This interest stems, first, from the considerable reductions in component volume and cost that should accrue by fabricating resistive and capacitive elements simultaneously. Additionally, it is also feasible to produce large ranges of R-C products and C to R ratios simply by varying the parameters of resistance and capacitance in the production process. Moreover, circuits employing this type component are more reliable since fewer connections are involved than for an equivalent "lumped" R-C network performing the same function. Beyond this, however, the interaction between the resistive and capacitive elements can produce circuit functions that are unobtainable in conventional lumped R-C circuits.

A single component having a distributed R-C characteristic may be constructed by employing suitably thin capacitor plates in a typical wound capacitor. The resistivity which in normal capacitor plates is discountable becomes quite significant at plate thickness of 1,000 Angstrom units or less. The difference in circuit performance between a component so constructed and a lumped R-C network stems from the differing current flows. Briefly, when a lumped resistor is in series with a capacitor, all of the charge which flows into or out of the capacitor must pass through the entire resistor. In the case of a distributed resistance, which is an electrode of the capacitor, not all of the individual charges traverse the entire length of the resistor. Rather, the charges may be regarded as being distributed over its length. In the latter case the average individual charge will traverse only one-half of the resistor when the capacitor either charges or discharges. Consequently, there is an equivalence factor of one-half between the distributed resistance and that of an external lumped resistor.

Another characteristic of distributed R-C networks is that their impedance parameters differ materially from those of an equivalent lumped element network. The impedance of the latter decreases with increasing frequency until finally the resistive component dominates. The total impedance at all higher frequencies is equal essentially to the resistance. On the other hand, the impedance of a distributed element network generally continues to decrease with increasing frequency, depending upon the configuration of the elements in the component. This effect when enhanced can be very useful, as in relay contact protection, to select a single example.

In the design of distributed R-C components, one principal problem relates to the choice of materials and the manner of electrical connection to these materials. An important consideration, of course, is the ease with which the component may be produced and the related problem involving reliability of the terminations to the capacitor plates. Another more general problem is the matter of achieving in one compact component the specific structural configuration that will perform a given desired network function normally the province of lumped R-C networks. A further problem is that distributed R-C component structures known to applicant have not exhibited the high, reliable performance at the low costs that were presumed possible.

Accordingly, a general object of the invention is to increase the effectiveness of distributed R-C networks.

Another object of the invention is to improve the reliability of such networks while lowering their cost.

A further object of the invention is to achieve a large measure of flexibility with respect to R-C products and C to R ratios in single-component distributed R-C elements.

These and other objects are accomplished, in accordance with the invention, broadly, in a novel tubular component structure of alternate layers of plastic and conductive thin film characterized in each case by highly tenacious terminations and a relationship of terminations to disposition of the opposed conductive films that is readily producible and further that results in substantially prolonged component life.

More specifically, the invention contemplates several structural configurations found to be extremely practicable as distributed R-C components, particularly from the standpoints of durability and cost, but also importantly from the standpoint of ease of manufacture.

While not necessarily limited thereto, the invention in one form comprises in a single component four layers alternately of plastic and metal in which at least one of the layers is a metallized plastic strip, typically a MYLAR strip to one side of which a thin metallic coating —usually aluminum—has been applied.

In one particular embodiment the invention comprises a plastic strip coated on one side with a thin metallic film, a clear plastic strip registered therewith in offset relation and of about equal length, and finally a thin conductive foil overlaying the plastic and again offset. The protruding metallic edges of both the film and the foil serve as surfaces to which the electrical leads are connected. Alternatively, a selected end of one metallic surface and the entire protruding edge of the other may serve as the terminations to which connectors are fastened. This structure may be fabricated readily by the methods conventionally employed in wound capacitor art.

In another embodiment of the invention, a plastic strip, having one one side a thin film of evaporated aluminum, is registered metal-side-up with a clear plastic strip that protrudes well over both longitudinal edges of the MYLAR. Thereafter a foil is placed upon the clear strip in two separate and oppositely offset sections to form extended electrodes. Acting as the primary resistive element, the metallic aluminum film carries only displacement current which is distributed over the length of both electrodes, and is not weakened by any physical connections thereto.

Accordingly, a particular feature of the invention relates to the use of split foil electrodes in a distributed R-C network.

A further feature of the invention resides in the employment of a metallized plastic strip in which the metallized portion serves as a floating electrode in a distributed R-C network, to which no direct contact is made.

These and other objects and features of the invention are illustrated with greater particularity in the descriptions to follow of illustrative embodiments thereof and in the drawing in which:

FIG. 1 is a first embodiment of the invention in frontal perspective;

FIG. 1A is a perspective view showing the structure of FIG. 1 as partially wound;

FIG. 2 is a frontal perspective of a second illustrative embodiment of the invention;

FIG. 2A is a side view of the structure of FIG. 2;

FIG. 3 is a modification of the invention shown in FIG. 2, in frontal perspective;

Figure 4:
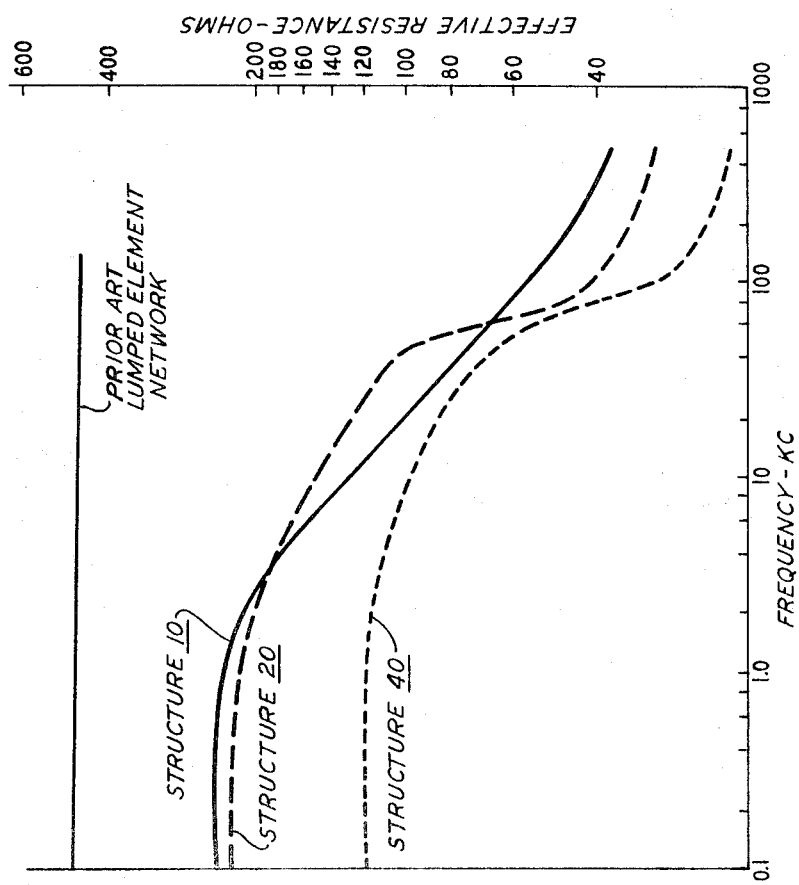
FIGS. 4 through 6 are graphs showing various relationships for applicant's structures.

In FIG. 1, a tubular electrical component embodying the inventive concept is shown comprising three strips, 11, 12 and 13, in an overlay configuration and unwound for clearer presentation. Strip 11 is a tough plastic, to one side 14 of which a very thin film of evaporated metal—advantageously aluminum—has been deposited. Strip 12 extends slightly beyond an upper edge 15 of strip 11 and is also of a plastic material such as plastic. Strip 13 is an elongated metallic strip, advantageously, tin foil. Alternatively, strip 13 may be a second plastic strip coated on one side with a thin metallic film with the latter contacting strip 12. A tab or terminal strip 16, that protrudes out beyond the edge of the plastic strip 12, serves as a terminal for the metallic part of strip 13. Tab 16 may be an integral part of strip 13 or may be provided separately. A lower edge 18 of thin film 14 is left exposed as a termination surface. Strip 12 must be so registered as to insulate metallic coating 14 and the metal of tab 16 at all places. FIG. 1A illustrates this configuration in a partially tubular form and includes connectors 17 and 17' attached respectively to tab 16 and the lower protruding edge 18 of strip 11. Charges entering at tab 16 are distributed along the entire length of the metallic portion of strip 13. It develops that this type of winding is essentially noninductive, being the equivalent of a coil of one turn. The thickness of the strips is exaggerated for clarity in FIG. 1 and succeeding figures. In practice, the plastic is about 0.25 to 0.50 mils thick, the foil where used is about 0.25 mils, and the evaporated thin film is a few hundred Angstrom units thick. The latter may be varied widely, however, depending on the effect desired.

The structure 20 shown in FIG. 2 and in FIG. 2A employs a strip of plastic 21, having a metallic coating 22, a strip of clear plastic 23 and two separated strips of metal foil 24 and 25. An edge 26 of foil strip 24 is offset beyond the corresponding longitudinal edge 27 of clear plastic strip 23. Correspondingly, an edge 28 of foil strip 25 is offset beyond the opposite longitudinal edge 29 of strip 23. Strip 21 may be constructed having a narrower width than that of strip 23; and is so registered therewith that the edges 27, 29 of strip 23 entirely overlap strip 21. Strip 21 is continuous as shown in FIG. 2A. If the plastic of strip 21 is constructed with the same width as that of strip 23, then metallic coating 22 must be made narrower than this width so that plastic margins remain on both sides of strip 21. Advantageously, metallic coating 22 may be a thin evaporated aluminum film. The opposite offsets noted for foil strips 24, 25 provide, in accordance with one aspect of the invention, substantial edges so that when the component is rolled into its tubular shape (not shown) connections may be soldered or otherwise affixed along the entirety of each edge.

The foil and plastic strips typically are fed continuously from spools during manufacture. One method for producing the structure of FIG. 2 is to wind one-half of the component with the foil spool offset along one edge 27 of strip 23. The foil can then be severed and its feed interrupted to produce a short separation 31. The foil spool is thereafter shifted to the other side of strip 23 and foil can again be fed but with an opposite offset, this time along the opposite edge 29. The extended portion of the foils may be then attached to wire leads, as earlier described.

In accordance with the invention, structure 20 consists in effect of two capacitors in series which are connected internally by the aluminized plastic strip. With two capacitors of equal value in series, an impressed AC or transient voltage will divide equally between them. Hence, for the same voltage rating the dielectric film in this structure need be only half as thick as that used in the preceding structure. Consequently, the same ratio of capacitance to volume may be retained.

It should be apparent that the strips 11, 12, 13 of FIG. 1, the strips 21 and 23 of FIG. 2, and the strips 41 and 42 of FIG. 3 can be made from any dielectric material (practically speaking, either plastic or paper) that can be metallized and wound. One exemplary film is a polyester of terephthalic acid condensed with ethylene glycol and known in the trade as MYLAR. Other equivalent tough, metallizable and windable films are also usable to make the strips.

A modification of the structure shown in FIG. 2 is presented in FIG. 3 as 40, and comprises a winding of metallized plastic 41, a winding of clear plastic 42 and a pair of metal foils of tin or aluminum 43, 44. Advantageously, terminals 45 and 46 are laid-in on foils 43 and 44, respectively, at opposite ends thereof. The foils are separated as in structure 20 but instead of being offset are disposed in line to reduce the structure's cost.

Since the structures 20 and 40 each comprise two capacitors in series, they both have considerably less capacitance than an equivalent lumped element network. Despite this their impedance especially at higher frequencies is low. With this lower capacitance, in accordance with the invention, an even lower resistivity may be tolerated which in turn would lower the impedance still further. It has been found that an optimal resistivity range for the metallic coating exists between 1 and 100 ohms per square.

An alternative for the aluminized plastic film is zinc metallized film. Further, it is possible to employ a polycarbonate film and an aluminum foil to construct the novel structures herein described.

Figure 5:
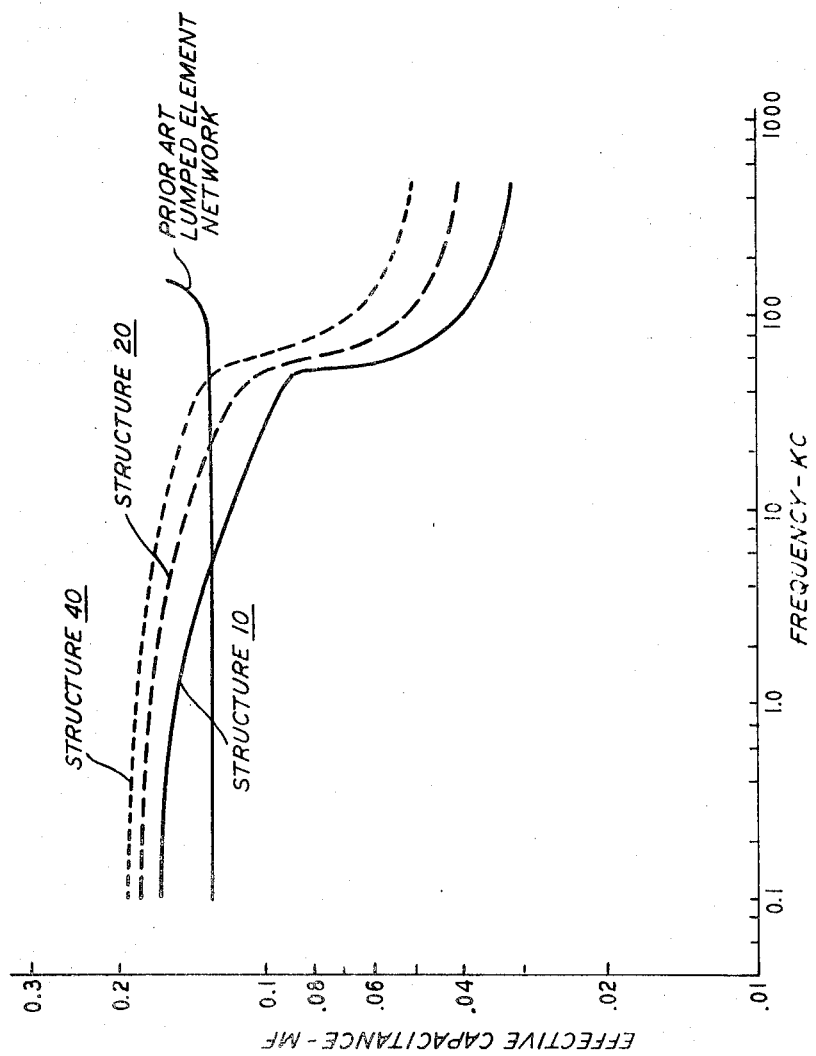
Figure 6:
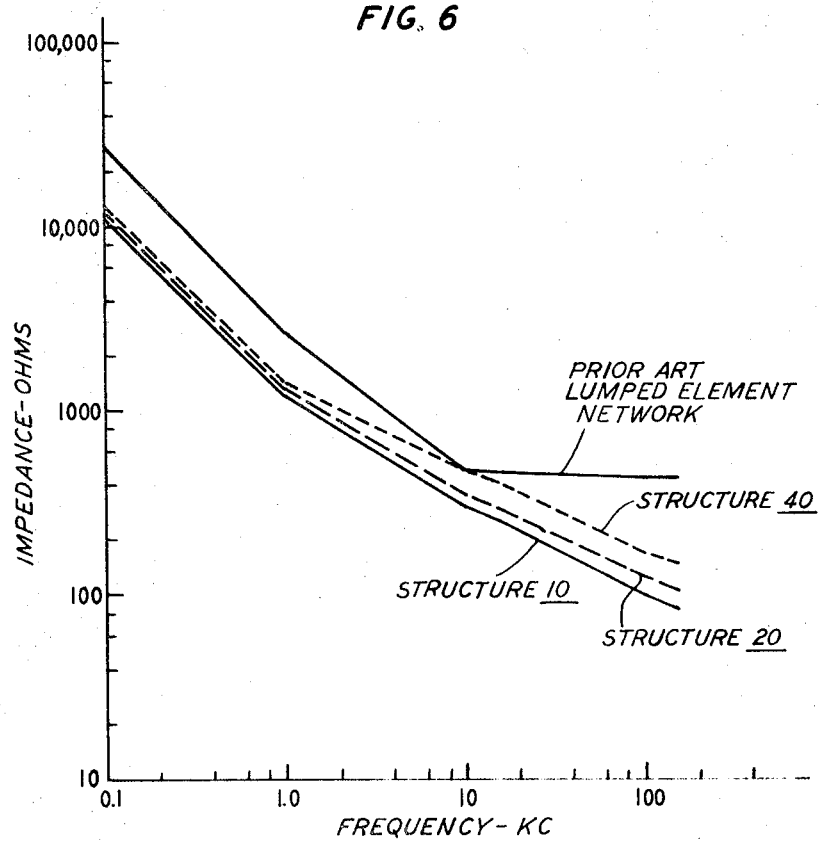

The differences between the electrical characteristics of structures constituted in accordance with the present invention and herein described and those of an equivalent lumped element network are illustrated generally in the graphs of FIGS. 4, 5 and 6.

Figure 7:
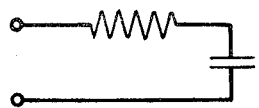
FIG. 7 is a circuit schematic for an old art structure.

FIG. 4 is a plot of effective series resistance vs. frequency for applicant's new structures and for a prior art lumped element structure that is shown schematically in FIG. 7. It is seen that the effective resistance of applicant's novel structures continually decreases with increasing frequency in contrast to that of the prior art network which remains constant.

FIG. 5 is a plot of effective capacitance vs. frequency for these same structures. It may be seen that although the effective capacitance of applicant's new structures decreases with increasing frequency, the total impedance of the distributed R-C networks still decreases. This occurs principally because in such a network the effective series resistance also decreases with increasing frequency.

FIG. 6 plots impedance vs. frequency for all structures. With increasing frequency, the total impedance of applicant's structures continues to decrease; whereas for the lumped network the impedance levels off beyond 10 mc.

In addition, the phase angle of all the novel structures has been found to approach −45° as frequency increases. In contrast, the phase angle of a lumped element network approaches zero degrees. Wherever a negative phase angle characteristic is desired, applicant's structures can be employed to good advantage.

One ready application of any of the structures shown, is as a relay contact protection network. These conventionally comprise a capacitor and a resistor connected either in series or in parallel, as illustrated, for example, in U.S. Pat. No. 2,199,909, issued May 7, 1940 to E. T. Burton et al. Networks such as this typically are connected to the two leads of a relay coil so that when the contacts open the network absorbs and dissipates the residual energy in the coil, thus preventing excessive voltage rise at the contacts which if unchecked would cause sparking. When the contacts close, the resistor limits the capacitor charging current. The impedance of the lumped element network will eventually become constant with increasing frequency. In contrast, under the same circumstances the impedance of applicant's distributed R-C network as, for example, a structure 40 continues to decrease. This network is considerably more effective in transmitting energy at the instant the contacts open, when the rate of voltage rise is greatest. The voltage rise at the contact is thereby delayed until the gap becomes large enough to preclude sparking. The distributed element network is also much smaller than the equivalent lumped element network, and yet has the same voltage rating. In addition, the self-healing characteristic of metallized dielectric film provides a reliability feature that is particularly desirable in networks undergoing almost incessant usage and exposed to frequent voltage surges.

Figure 8:
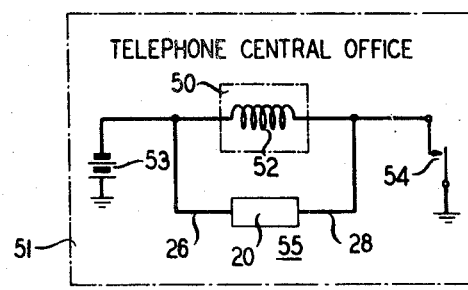
FIG. 8 shows an application for the herein described network, in which it is used to protect relay contacts.

Use of applicant's structure 20 as a relay contact protection network is illustrated in FIG. 8. A telephone relay 50, shown as part of central office 51, includes a relay coil 52, connected to a power source such as battery 53 through relay contacts 54. The contact protection network designated 55 is the aforedescribed structure 20 connected across coil 52 by its protruding edges 26, 28.

While several illustrative embodiments of the inventive concept have been shown and described, it is to be expressly understood that further changes and modifications may be made therein without departing from the spirit and scope of the invention.

What is claimed is:

1. In combination:
   a telephone central office relay comprising an inductive coil and means including contacts for energizing said coil, and
   a network for protecting said contacts from arcing, comprising,
   an elongated plastic strip having a thin metallic coating on one side thereof, said coating having a resistivity of from 1-100 ohms per square;
   a first elongated metallic foil registered over a first end of said metallic coating and protruding beyond the upper edge thereof;
   a second elongated elongated metallic foil registered over the opposite end of said metallic coating and substantially separated from said first metallic foil, said second foil protruding beyond the lower edge of said metallic coating;
   means insulating said metallic coating from each said metal foil;
   means including the respective protruding edges of said first and second metallic foils for connecting said network across said coil; and
   said network characterized in that its effective impedance as measured across said protruding edges decreases with increasing frequency.

2. The combination of claim 1, wherein said elongated plastic strip is continuous and is substantially narrower in width than said means insulating said metallic coating, the said insulating means being so registered with said strip that its longitudinal edges extend at all points beyond the edges of said metallic coating.

3. The combination of claim 1, wherein said metallic coating comprises evaporated aluminum, wherein said first and second metallic foils are comprised of tin, and wherein said plastic strip and said insulating means are comprised of a polyester of terephthalic acid condensed with ethylene glycol.